United States Patent
More

(10) Patent No.: US 8,406,456 B2
(45) Date of Patent: Mar. 26, 2013

(54) METHODS AND SYSTEMS FOR IMAGE FINGERPRINTING

(75) Inventor: Scott More, Tokyo (JP)

(73) Assignee: Workshare Technology, Inc., San Francisco, CA (US)

(*) Notice: Subject to any disclaimer, the term of this patent is extended or adjusted under 35 U.S.C. 154(b) by 996 days.

(21) Appl. No.: 12/275,185

(22) Filed: Nov. 20, 2008

(65) Prior Publication Data

US 2010/0124354 A1    May 20, 2010

(51) Int. Cl.
 G06K 9/00    (2006.01)
 H04N 7/167   (2011.01)
 H04L 9/32    (2006.01)

(52) U.S. Cl. .................... 382/100; 380/202; 713/176

(58) Field of Classification Search ............... 382/100, 382/101, 176, 190, 286; 705/58, 406; 380/55, 380/202; 713/176
See application file for complete search history.

(56) References Cited

U.S. PATENT DOCUMENTS

| | | | |
|---|---|---|---|
| 4,479,195 A | 10/1984 | Herr et al. | |
| 4,949,300 A | 8/1990 | Christenson et al. | |
| 5,008,853 A | 4/1991 | Bly et al. | |
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mori et al. | |
| 5,293,619 A | 3/1994 | Dean | |
| 5,379,374 A | 1/1995 | Ishizaki et al. | |
| 5,446,842 A | 8/1995 | Schaeffer et al. | |
| 5,608,872 A | 3/1997 | Schwartz et al. | |
| 5,617,539 A | 4/1997 | Ludwig et al. | |
| 5,671,428 A | 9/1997 | Muranaga et al. | |
| 5,699,427 A * | 12/1997 | Chow et al. ................. | 705/58 |
| RE35,861 E | 7/1998 | Queen | |
| 5,787,175 A | 7/1998 | Carter | |
| 5,819,300 A | 10/1998 | Kohno et al. | |

(Continued)

FOREIGN PATENT DOCUMENTS

| | | |
|---|---|---|
| JP | 10177650 A | 6/1998 |
| JP | 2004265267 A | 9/2004 |

(Continued)

OTHER PUBLICATIONS

Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.*

(Continued)

*Primary Examiner* — Andrae S Allison
(74) *Attorney, Agent, or Firm* — Perkins Coie LLP

(57) ABSTRACT

The present invention provides methods and systems to protect an organization's secure image information from unauthorized disclosure. In one embodiment, methods and systems to generate image fingerprints are provided. The fingerprints are generated for each feature point of an image data. Because the fingerprints take into account the neighborhood features around each feature point, the image fingerprints are robust against derivate images where the original image may have been altered. Methods and systems to maintain a fingerprint database for an organization's secure image data is also provided. In one embodiment, client fingerprints are generated for image data that a user intends to transmit outside of the organization. In some embodiments, suitable security actions are initiated if any of the client fingerprints match any of the fingerprints in the fingerprint database.

45 Claims, 5 Drawing Sheets

U.S. PATENT DOCUMENTS

| | | | |
|---|---|---|---|
| 5,890,177 | A | 3/1999 | Moody et al. |
| 6,067,551 | A | 5/2000 | Brown et al. |
| 6,088,702 | A | 7/2000 | Plantz et al. |
| 6,145,084 | A | 11/2000 | Zuili et al. |
| 6,212,534 | B1 | 4/2001 | Lo et al. |
| 6,301,368 | B1 | 10/2001 | Bolle et al. |
| 6,449,624 | B1 | 9/2002 | Hammack et al. |
| 6,513,050 | B1 | 1/2003 | Williams et al. |
| 6,560,620 | B1 | 5/2003 | Ching |
| 6,584,466 | B1 | 6/2003 | Serbinis et al. |
| 6,614,789 | B1 | 9/2003 | Yazdani et al. |
| 6,658,626 | B1 | 12/2003 | Aiken |
| 7,035,427 | B2 | 4/2006 | Rhoads |
| 7,107,518 | B2 | 9/2006 | Ramaley et al. |
| 7,152,019 | B2 | 12/2006 | Tarantola et al. |
| 7,212,955 | B2 | 5/2007 | Kirshenbaum et al. |
| 7,233,686 | B2 * | 6/2007 | Hamid ........... 382/124 |
| 7,240,207 | B2 | 7/2007 | Weare |
| 7,299,504 | B1 | 11/2007 | Tiller et al. |
| 7,356,704 | B2 | 4/2008 | Rinkevich et al. |
| 7,454,778 | B2 | 11/2008 | Pearson et al. |
| 7,496,841 | B2 | 2/2009 | Hadfield et al. |
| 7,564,997 | B2 * | 7/2009 | Hamid ........... 382/124 |
| 7,624,447 | B1 | 11/2009 | Horowitz et al. |
| 7,627,613 | B1 | 12/2009 | Dulitz et al. |
| 7,673,324 | B2 | 3/2010 | Tirosh et al. |
| 7,680,785 | B2 | 3/2010 | Najork |
| 7,694,336 | B2 | 4/2010 | Rinkevich et al. |
| 7,857,201 | B2 | 12/2010 | Silverbrook et al. |
| 7,877,790 | B2 | 1/2011 | Vishik et al. |
| 7,890,752 | B2 | 2/2011 | Bardsley et al. |
| 8,005,277 | B2 * | 8/2011 | Tulyakov et al. ........ 382/125 |
| 8,042,112 | B1 | 10/2011 | Zhu et al. |
| 8,181,036 | B1 | 5/2012 | Nachenberg |
| 2002/0019827 | A1 | 2/2002 | Shiman et al. |
| 2002/0063154 | A1 | 5/2002 | Hoyos et al. |
| 2002/0065848 | A1 | 5/2002 | Walker et al. |
| 2002/0136222 | A1 | 9/2002 | Robohm |
| 2002/0138744 | A1 | 9/2002 | Schleicher et al. |
| 2002/0159239 | A1 | 10/2002 | Amie et al. |
| 2002/0164058 | A1 | 11/2002 | Aggarwal et al. |
| 2003/0037010 | A1 | 2/2003 | Schmelzer |
| 2006/0005247 | A1 | 1/2006 | Zhang et al. |
| 2006/0021031 | A1 | 1/2006 | Leahy et al. |
| 2006/0050937 | A1 * | 3/2006 | Hamid ........... 382/124 |
| 2006/0059196 | A1 | 3/2006 | Sato et al. |
| 2006/0064717 | A1 | 3/2006 | Shibata et al. |
| 2006/0098850 | A1 * | 5/2006 | Hamid ........... 382/124 |
| 2006/0112120 | A1 * | 5/2006 | Rohall ........... 707/101 |
| 2006/0171588 | A1 * | 8/2006 | Chellapilla et al. ....... 382/185 |
| 2006/0224589 | A1 | 10/2006 | Rowney et al. |
| 2006/0271947 | A1 | 11/2006 | Lienhart et al. |
| 2007/0005589 | A1 | 1/2007 | Gollapudi |
| 2007/0025265 | A1 | 2/2007 | Porras et al. |
| 2007/0101154 | A1 | 5/2007 | Bardsley et al. |
| 2007/0101413 | A1 | 5/2007 | Vishik et al. |
| 2007/0253608 | A1 * | 11/2007 | Tulyakov et al. ........ 382/125 |
| 2007/0261112 | A1 | 11/2007 | Todd et al. |
| 2007/0294612 | A1 | 12/2007 | Drucker et al. |
| 2008/0033913 | A1 | 2/2008 | Winburn |
| 2008/0080515 | A1 | 4/2008 | Tombroff et al. |
| 2008/0219495 | A1 * | 9/2008 | Hulten et al. ........... 382/100 |
| 2008/0320316 | A1 | 12/2008 | Waldspurger et al. |
| 2009/0034804 | A1 | 2/2009 | Cho et al. |
| 2009/0064326 | A1 | 3/2009 | Goldstein |
| 2009/0129002 | A1 | 5/2009 | Wu et al. |
| 2009/0241187 | A1 | 9/2009 | Troyansky |
| 2010/0017850 | A1 * | 1/2010 | More et al. ........... 726/2 |
| 2010/0064372 | A1 | 3/2010 | More et al. |
| 2010/0070448 | A1 | 3/2010 | Omoigui |
| 2010/0299727 | A1 | 11/2010 | More et al. |

FOREIGN PATENT DOCUMENTS

| | | | |
|---|---|---|---|
| JP | 2007299364 A | | 11/2007 |
| KR | 1020010078840 | | 8/2001 |
| KR | 20040047413 A | | 6/2004 |
| KR | 1020060048686 | | 5/2006 |
| KR | 200070049518 A | | 5/2007 |
| KR | 1020080029602 | | 4/2008 |
| WO | WO-0060504 A1 | | 10/2000 |

OTHER PUBLICATIONS

Xuefeng Liang; Tetsuo Asano; , "Fingerprint Matching Using Minutia Polygons," Pattern Recognition, 2006. ICPR 2006. 18th International Conference on , vol. 1, No., pp. 1046-1049.*

Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16, 2007-Oct. 19, 2007.*

Yung et al, Generating Robust Digital Signature for Image/Video Authentication, Multimedia and Security Workshop at ACM Multimedia '98, Bristol, U.K., Sep. 1998.*

Mango. et al. Perceptual Image Hashing Via Feature Points: Performance Evaluation and Tradeoffs, IEEE Transactions on Image Processing, vol. 15, No. 11, Nov. 2006.*

Mango, Robust Perceptual Image Hashing Using Feature Points, http://bluecoat-02/?cfru=aHR0cDovL3NpZ25hbC5IY2UudXRIeGFzLmVkdS9+dmizaGFsL2hhc2gtcGFydEkucHM=, 2003.*

Co-pending U.S. Appl. No. 12/844,818, filed Jul. 27, 2010.

Final Office Action Mailed Apr. 17, 2007 for U.S. Appl. No. 10/023,010, filed Dec. 17, 2001, Issued Patent No. 7,496,841.

Final Office Action Mailed Aug. 12, 2011 for U.S. Appl. No. 12/209,096, filed Sep. 11, 2008.

International Search Report of PCT Application No. PCT/US2010/043345, Apr. 28, 2011, 3 pages.

Non-Final Office Action Mailed Dec. 22, 2011 in Co-Pending U.S. Appl. No. 12/209,082.

Non-Final Office Action Mailed Jan. 9, 2012 in Co-Pending U.S. Appl. No. 12/177,043, filed Jul. 21, 2008.

Non-Final Office Action Mailed Mar. 11, 2011, in Co-pending U.S. Appl. No. 12/209,096, filed Sep. 11, 2008.

Non-Final Office Action Mailed Mar. 16, 2006 for U.S. Appl. No. 10/023,010, filed Dec. 17, 2001, Issued Patent No. 7,496,841.

Non-Final Office Action Mailed Sep. 19, 2011 for U.S. Appl. No. 12/177,043, filed Jul. 21, 2008.

Restriction Requirement Mailed Feb. 14, 2005 for U.S. Appl. No. 10/023,010, filed Dec. 17, 2001, Issued Patent No. 7,496,841.

Restriction Requirement Mailed Feb. 5, 2008 for U.S. Appl. No. 10/023,010, filed Dec. 17, 2001, Issued Patent No. 7,496,841.

Restriction Requirement Mailed Jun. 30, 2006 for U.S. Appl. No. 10/136,733, filed Apr. 30, 2002.

International Search Report of PCT Application No. PCT/US2009/056668 dated Apr. 16, 2010, pp. 1-9.

Written Opinion PCT Application No. PCT/US2009/056668 dated Apr. 16, 2010 pp. 1-4.

Weiss et al., Lightweight document matching for help-desk applications, In: Intelligent Systems and their Applications, IEEE, Vo. 15, Issue:2, pp. 57-61, ISSN 1094-7167, 2000.

International Search Report of PCT Application No. PCT/US2009/065019 dated Jun. 4, 2010, pp. 1-6.

Written Opinion PCT Application No. PCT/US2009/065019 dated Jun. 4, 2010, p. 1-5.

International Search Report of PCT Application No. PCT/US2009/056651, Dated Apr. 21, 2010, pp. 1-3.

Written Opinion PCT Application No. PCT/US2009/056651, Dated Apr. 21, 2010, pp. 1-5.

International Search Report of PCT Application No. PCT/US2009/064919 dated Jul. 1, 2010, pp. 1-3.

Written Opinion PCT Application No. PCT/US2009/064919 dated Jul. 1, 2010, pp. 1-4 pages.

PC Magazine "Pure Intranets: Real-Time Internet Collaboration", http://www.zdnet.com/pcmag/featuresgroupware/gpwst.htm, Aug. 30, 2001, 2 pages.

Wells et al., "Groupware & Collaboration Support", www.objs.com/survey/groupwar.htm, Aug. 30, 2001, 10 pages.

Tsai, et al., "A Document Workspace for Collaboration and Annotation based on XML Technology", IEEE, 2000, pp. 165-172.

Roussev, et al., "Integrating XML and Object-based Programming for Distributed Collaboration", IEEE, 2000, pp. 254-259.
XP-002257904, "Workshare Debuts Synergy", 2003, 3 pages.
Microsoft, "Microsoft XP, Product Guide", pp. 1-26.
International Search Report of PCT Application No. PCT/IB2002/005821, Jan. 30, 2004, 6 pages.
International Search Report of PCT Application No. PCT/US2009/051313, Mar. 3, 2010, 3 pages.
Written Opinion of PCT Application No. PCT/US2009/051313, Mar. 3, 2010, 4 pages.
Co-pending U.S. Appl. No. 10/136,733, filed Apr. 30, 2002.
Co-pending U.S. Appl. No. 10/023,010, filed Dec. 17, 2001.
Co-pending U.S. Appl. No. 12/177,043, filed Jul. 21, 2008.
Co-pending U.S. Appl. No. 12/209,096, filed Sep. 11, 2008.
Co-pending U.S. Appl. No. 12/621,429, filed Nov. 18, 2009.
Co-pending U.S. Appl. No. 12/209,082, filed Sep. 11, 2008.
Non-Final Office Action Mailed Mar. 20, 2006 in Co-pending U.S. Appl. No. 10/136,733, filed Apr. 30, 2002.
Notice of Allowance Mailed Oct. 24, 2008 in Co-pending U.S. Appl. No. 10/023,010, filed Dec. 17, 2001.
Non-Final Office Action Mailed May 7, 2008 in Co-pending U.S. Appl. No. 10/023,010, filed Dec. 17, 2001.
Non-Final Office Action Mailed Aug. 1, 2012 in Co-Pending U.S. Appl. No. 12/621,429, filed Nov. 18, 2009.

* cited by examiner

METHODS AND SYSTEMS FOR IMAGE FINGERPRINTING

CROSS-REFERENCE TO RELATED APPLICATIONS

This application is related to U.S. application Ser. Nos. 12/177,043, 12/209,096, and 12/209,082, which are incorporated by reference as if fully set forth herein.

FIELD OF INVENTION

The present invention relates to information security and more specifically it relates to systems and methods for detecting and preventing unauthorized disclosure of secure information. Furthermore, the present invention pertains to fingerprinting image data.

BACKGROUND OF THE INVENTION

With the rapid increase and advances in digital documentation services and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information (or derivatives thereof) from being disclosed beyond the perimeters of the organization.

Additionally, the organizations face the challenge of categorizing and maintaining the large corpus of digital information across potentially thousands of data stores, content management systems, end-user desktops, etc. It is therefore important to the organization to be able to store concise and lightweight versions of fingerprints corresponding to the vast amounts of image data.

Many organizations store sensitive data in the form of digital images. Image data is susceptible to being transformed from its original form to a derivate form. Examples of derivative image data include image file format conversion (e.g., changing a BMP image format to a JPEG image format, etc.), cropping the original image, altering dimensions of the original image, change in scale and/or orientation of the original image, rotation of the image by an angle, etc.

Therefore, it is critical to the organization's security to be able to identify derivative forms of the secure image data and identify any unauthorized disclosure of even such derivative forms. Therefore, any system or method built to accomplish this task of preventing unauthorized disclosure would have to address at least these two conflicting challenges.

One method to detect derivative image data is to sample features across the entire original image, record the values of the sampled features, and perform a nearest neighbor search of the sampled features. The nearest neighbors on the original image are compared against the nearest neighbors of the image being inspected to detect similarities. In one example of this prior art method, a histogram of RGB pixel values is generated for the entire original image, and compared against a histogram of RGB pixel values generated for the entire image to be inspected. If the histograms of the original image and the image being inspected are approximately similar, a similarity is detected. However, this entire image approach is not suitable for partial image matches (e.g., when the image to be inspected is only a portion of the original image), and does not handle several types of transformations in a derivate image. For example, cropping the image to be inspected in half drastically changes its global characteristics, and will therefore escape detection when compared against the original image.

Other methods operate on local regions of the image, improving the ability to detect derivative image data. These methods are predominantly broken into two steps. In the first step, distinct features (hereinafter "feature points") are identified within the image. The feature points are identified by locating edges or corners within the image. Other algorithmic approaches may also be employed to identify feature points. Examples of such algorithmic approaches include Harris detection, Moravec detection, Shi and Tomasi detection, Harris-Laplace detection, FAST, SIFT, etc.

In the second step, descriptors are computed by examining the regions surrounding the feature points. The descriptors are recorded and searched to correlate derived regions within the image. Examples of the descriptor methods include creating a histogram, employing SIFT, using steerable filters, or using moment invariants.

However, this approach also suffers from several disadvantages. The first disadvantage is that the descriptors are large, and therefore occupy a large space. The cost and efficiency associated with storing and maintaining these large descriptors compound and increase with an increase in the amount of digital information an organization intends to protect. Additionally, comparing feature points involves searching through a highly dimensional space, making this approach computationally slow.

SUMMARY OF THE INVENTION

Methods and systems to provide efficient means to monitor and protect an organization's secure image information using image fingerprints is provided. In one embodiment, the present invention provides methods and systems to fingerprint image data. In some instances, the image data is normalized to a canonical format. Feature points are identified in the normalized image data. A plurality of closest neighbors is determined for each feature point.

In one embodiment, an anchor point is identified among the plurality of closest neighbors of each feature point. In some instances, the distance between the feature point and each of its closest neighbors is calculated relative to the distance between the feature point and the anchor point. Similarly, in some instances, the angle between the feature point and its closest neighbors is computed relative to the angle between the feature point and the anchor point. In one embodiment, the angle and distance information is used to generate a point vector. A hash function is then applied over the point vectors to generate a fingerprint for the corresponding feature point.

In one embodiment, methods and systems to maintain an image fingerprint based security mechanism is provided. Here, a fingerprint server maintains image fingerprints corresponding to secure image data that an organization desires to protect. In some instances, client systems (e.g., a user's personal computer) are monitored, and fingerprints are generated for any image data that the user desires to transmit outside of the organization. In some instances, the client fingerprints are compared and matched against the fingerprints in the fingerprint server. If any of the fingerprints from the client systems match any of the fingerprints in the fingerprint server, an appropriate security event is initiated (e.g., blocking the user's access to an image data file, etc.).

In some instances, when generating the fingerprints, the angles and distances are computed relative to the anchor point. The angles and distances are computed using a predetermined direction of rotation about the feature point. This ensures that similar fingerprints are generated for the original image data and derivate versions where the image data is rotated or skewed by an angle. Additionally, since the fingerprints capture the features of their neighborhood (for example, by calculating point vectors of closest feature points), the fingerprints are robust against variations in a derivate image data (e.g., when the original image is cropped). Additionally, a single fingerprint is computed for all point vectors corresponding to a feature point's neighborhood. This allows for efficient and lower cost establishment and maintenance of an organization's secure fingerprint database.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
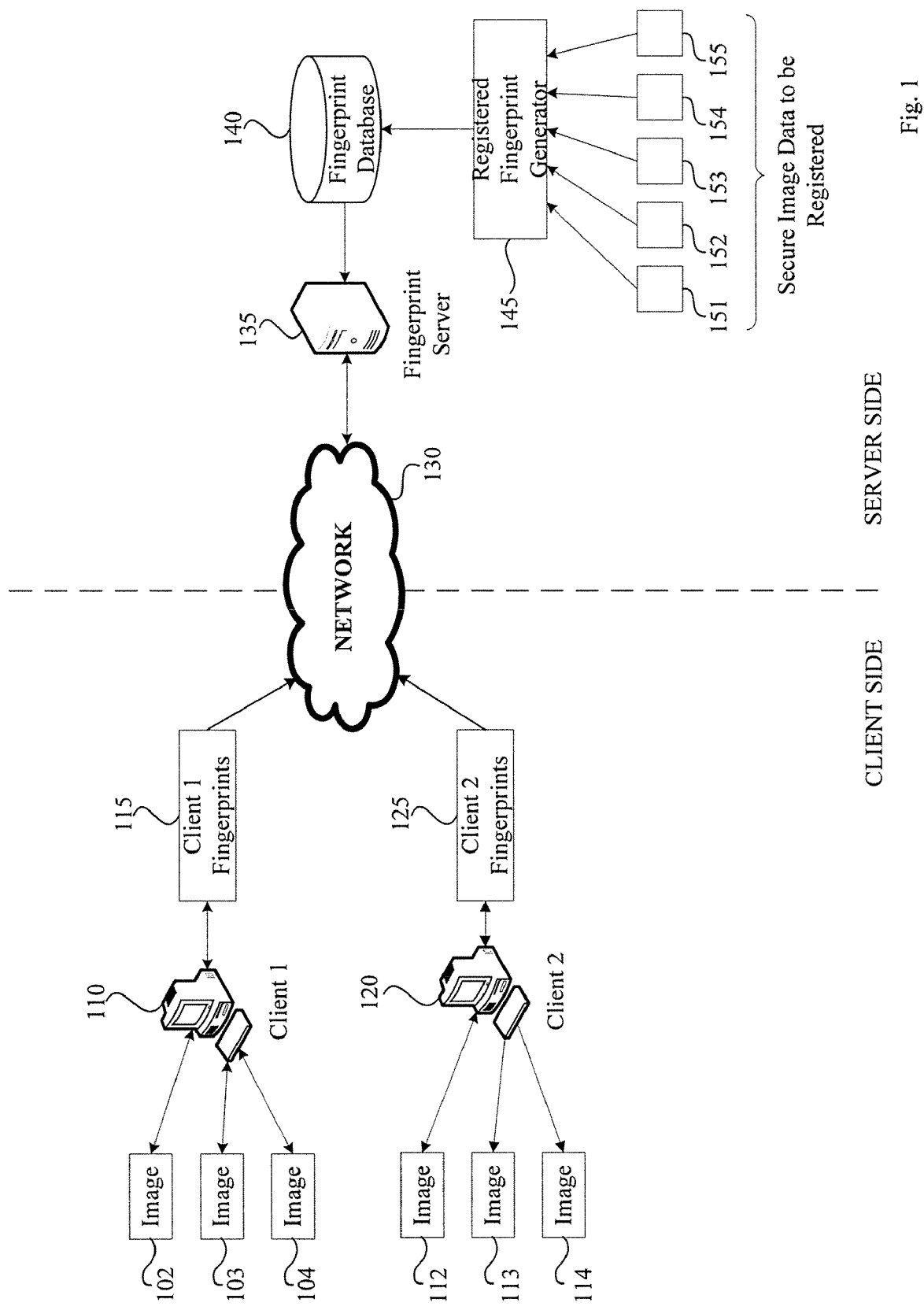
FIG. 1 illustrates an exemplary embodiment of an image fingerprinting and derivative image data detection system.

FIG. 1 illustrates an overall embodiment of a setup to protect an organization's secure image information from unauthorized disclosure. In one embodiment, the setup has several clients (e.g., Client 1 110, Client 2 120, etc.). Each of these clients represents an egress point through which a user may transmit secure image information outside of the organization. An egress point is a location or device through which a user may, for example, transmit information outside of the organization.

When a user desires to transmit image data through a client (e.g., 110, 120, etc.), the client computer, in some instances, generates one or more fingerprints for each image data. As depicted in FIG. 1, client 1 110 accepts image data (e.g., 102, 103, 104, etc.) that a first user desires to transmit through client 1 110. Similarly, client 2 120 also accepts image data (e.g., 112, 113, 114) that a second user desires to transmit through client 2 120. In one embodiment, fingerprinting software is available in each of the clients to generate one or more fingerprints for each image data. The clients contain at least one processor to execute the fingerprinting software. In some instances, the processor is coupled to a memory that stores the instructions corresponding to the fingerprinting software. Examples of the memory include read-only memory (ROM), random access memory (RAM), magnetic disk storage media, optical storage media, flash memory devices, etc.

Detailed information on the various modules of the fingerprinting software and methods for implementing the fingerprinting software are discussed further below.

As illustrated in FIG. 1, in one embodiment, the clients (e.g., 110, 120) generate fingerprints for the image information that users desire to transmit outside of the organization. These fingerprints (e.g., 115, 125) are then compared against a repository of secure or registered fingerprints (e.g., 140).

The setup illustrated in FIG. 1, in some instances, employs a fingerprint server 135. In one embodiment, the fingerprint server 135 stores a fingerprint database 140. In some instances, the fingerprint database 140 contains a repository of fingerprints corresponding to secure image information that the organization intends to protect. Fingerprints are generated from the secure image information (e.g., 151, 152, 153, 154, 155, etc.) that the organization intends to protect.

Fingerprints for the secure image information are generated, in some instances, using a registered fingerprint generator 145. The registered fingerprint generator, in one embodiment, comprises a host computer to perform the operations of a fingerprinting software to generate secure fingerprints. The host computer contains at least one processor to execute the fingerprinting software. In some instances, the processor is coupled to a host memory that stores the instructions corresponding to the fingerprinting software. Examples of the memory include read-only memory (ROM), random access memory (RAM), magnetic disk storage media, optical storage media, flash memory devices, etc.

As discussed above, the secure fingerprints generated using the registered fingerprint software are stored, in some instances, in the fingerprint database 140. The fingerprint server 135 utilizes the fingerprint database 140 to compare client fingerprints (e.g., 115, 125, etc.) against the secure fingerprints corresponding to the secure image information of the organization.

In one embodiment, the client fingerprints (e.g., 115, 125, etc.) are transmitted to the fingerprint server 135 utilizing a network 130. The network 130, in some instances, may be a local network specific to the organization, or in other instances, may be the public internet, or in some other instances, may be combination of a local network and the public internet.

As discussed above, the client fingerprints, in some instances, are transmitted to the fingerprint server 135. The fingerprint server 135 compares the client fingerprints against the secure fingerprints contained in the fingerprint database 140. In some embodiments, when it is determined that one or more of the client fingerprints match against one or more of the secure fingerprints contained in the fingerprint database 140, a suitable security action is initiated.

Examples of such security actions include preventing the information from being transmitted out through the associated client, sending out a security alert to a system administrator, revoking the user's access to the particular information, alerting the user of the security violation, etc. The security actions may also include integration with third party software to offer security solutions (e.g., integration with Microsoft Windows® RMS to apply rights management to the information being disclosed). It is understood that these examples of security actions are used for illustrative purposes only, and that other security actions known to people skilled in the art may suitably be employed.

It is noted that, in some embodiments, the fingerprinting of the image data can occur at locations other than the egress point through which the image is transmitted. In one example, the image data may be transmitted across a network to a remote server, where the fingerprinting operations may be done. Matching of the client fingerprints against a repository of secure fingerprints may also be done at the remote server. In another example, the fingerprints may be locally generated at the site of the egress points, and the client fingerprints may be matched against a lightweight secure fingerprint database locally available at the site of the egress point. The reader's attention is directed to U.S. patent application Ser. No. 12/209,082 titled "Methods and Systems for Protect Agents Using Distributed Lightweight Fingerprints" and U.S. patent application Ser. No. 12/209,096 titled "Methods and Systems to Implement Fingerprint Lookups Across Remote Agents" for detailed information on the implementation of these examples.

Detailed description on the generation of image fingerprints and its application in detecting derivate image data is provided in reference to FIGS. 2-5 below.

Figure 2:
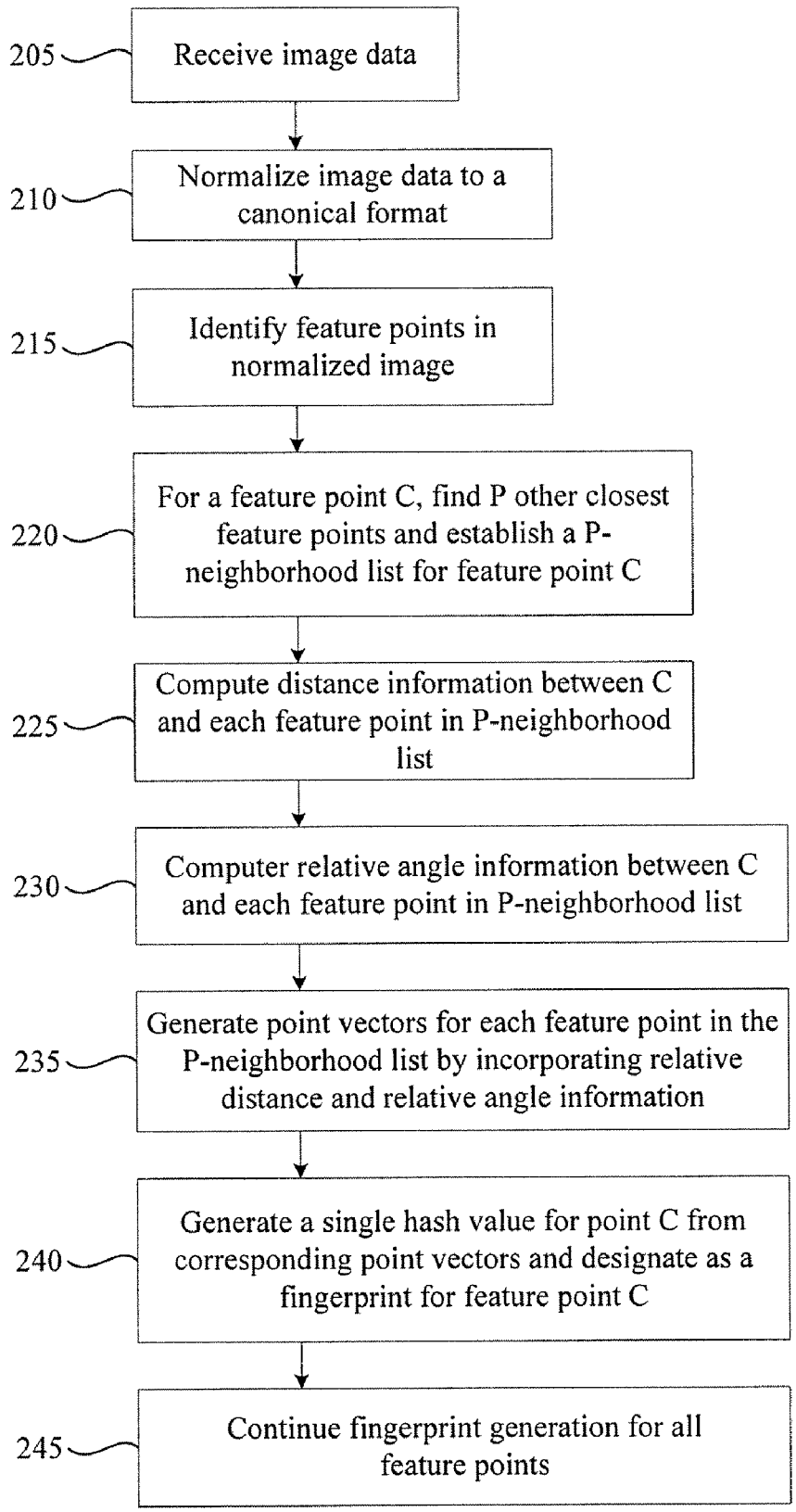
FIG. 2 is a flowchart depicting one embodiment of an overall method to generate image fingerprints.

FIG. 2 is a flowchart depicting a method for generating image fingerprints. In one embodiment, image data to be fingerprinted is first received 205 for further processing. This image data, in some instances, is first normalized to a canonical format 210. The received image may be in one of several digital image formats. Examples of digital image formats include BMP, JPEG, GIF, PNG, etc. The format of the received image data also includes any other digital image format known to people skilled in the art. The received image data, regardless of the format in which it is received, is converted to a common format. In some instances, the image data is represented as a two-dimensional array, with the elements of the array defining attributes or intensity values of the image data (e.g., RGB values, etc.) at each pixel location.

As indicated in step 215 of FIG. 2, in one embodiment, feature points are identified or received from the image data. In some instances, the feature points are identified by locating edges or corners within the image. As indicated above, other algorithmic approaches may also be employed to identify feature points. Examples of such algorithmic approaches include Harris detection, Moravec detection, Shi and Tomasi detection, Harris-Laplace detection, FAST, SIFT, etc. It is noted that, in some instances, the feature points are determined and selected at step 215. In other instances, the technique described with reference to FIG. 2 may start at step 215, where a previously determined set of feature points may be received for further processing.

It is also noted that the techniques described herein are not affected by the specific types or kinds of feature points selected. Therefore, in some instances, edges, corners, specific contrast regions, centers of polygons, etc. appearing in the image data may be employed as feature points. Although there are several approaches available to identify the feature points, it is important that the same approach be employed in both the registration stage (for generation of registered fingerprints for the fingerprint database 140, as explained in FIG. 1), and the identification stage (for generation of client fingerprints 115 and 125, as explained in FIG. 1).

As indicated in step 220, in one embodiment, a P-neighborhood list of feature points is established for each feature point identified/received using step 215. The P-neighborhood is determined, in some instances, by identifying a "P" number of closest feature points to each feature point "C" (hereinafter, "C-Point"). The P-neighborhood is then processed in later stages (as discussed in steps 223-345 below) to generate a fingerprint associated with the C-Point.

The number of feature points in the P-neighborhood of each C-Point influences the accuracy of detection when, for example, the fingerprint server (135 of FIG. 1) compares a client fingerprint against a registered fingerprint. A small number of feature points in the P-neighborhood will, in some instances, increase the probability of false positives (e.g., reporting that a client fingerprint matches against a registered fingerprint when the client fingerprint and registered fingerprint are not associated with the same image data). Therefore, depending on the amount of detection accuracy desired by an organization, the number of feature points in the P-neighborhood can be increased such that small local changes in the image data will be captured in the resulting fingerprint.

In some instances, there may be more than one equally distant closest points to the C-Point, making the overall number of feature points in the P-neighborhood greater than the required "P" value. In such instances, ties can be resolved by, for example, placing a limit on the overall number of equidistant points to consider or record in the P-neighborhood. In other instances, when there are too many equidistant points, the C-Point may be discarded from the feature point list. The justification for discarding such C-Points is that the particular feature point is uninteresting and would not result in a robust fingerprint. This approach of discarding uninteresting C-Points ensures that the overall fingerprint database is efficiently maintained.

There are at least two approaches using which the P-neighborhood may be determined. These two approaches will be discussed in detail with reference to FIG. 3 below.

In step 225, the distance between the C-Point and its associated P-neighborhood feature points are computed and recorded. The distance between two feature points, in some instances, is determined by computing the Euclidean distance between the two feature points. Therefore, if the first feature point is at location (x,y) and the second feature point is at location (x', y'), the distance between the two points can be calculated using the Euclidean distance formula, given by $\sqrt{(x-x')^2+(y-y')^2}$. However, in some embodiments, the techniques described herein use a modified Euclidean distance formula to determine the distance between two feature points for the purpose of establishing the P-neighborhood of each C-Point.

In the modified Euclidean distance formula, the expensive square-root operation is excluded. Even without the square-root operation, the square of the distance values, as determined by $(x-x')^2+(y-y')^2$ preserves the comparative distance between the two feature points, and therefore is adequate to identify the P-neighborhood feature points. The distance between each C-Point and its associated P-neighborhood feature points is computed, and therefore a large number of distance computation steps are involved in image fingerprinting. It is therefore beneficial to exclude the expensive square-root operation of the Euclidean distance formula to considerably reduce the overall computation time.

In some instances, the distance between the C-Point and the P-neighborhood feature points is not sufficient to produce a sufficiently unique description of the feature region. It is therefore desirable to incorporate information about the angle between the C-Point and the P-neighborhood feature points, as indicated in step 230. The distance and angle information between the C-Point and each P-neighborhood point is combined, in some instances, to obtain a vector value (a "point vector"), as indicated in step 235.

In some instances, each point vector may be computed using the distance and angle between the actual locations of the feature points in the image data. However, in derivate image formats, even a small change in the angle of the image may result in the generation of completely different angle values between the feature points, thus resulting in different point vectors. It is therefore beneficial to use "relative" angle and distance information for computation of the point vectors, to maintain consistency in point vectors even in derivate formats of the image data. Detailed description of generation of point vectors by computation of angle and distance information relative to an "anchor point" is provided with reference to FIG. 4 below.

As indicated in step 240, a single hash value is generated for each C-Point by taking in to account all point vectors associated with the P-neighborhood feature points. Therefore, regardless of the number of feature-points included in the P-neighborhood, a single hash value is generated, and this hash value is designated as a fingerprint for the C-Point. Additional details on normalization of the relative distance and angle between the C-Point and all P-neighborhood point vectors and final generation of the hash values is described in greater detail with reference to FIG. 5 below.

After completion of fingerprint generation of a first C-Point, in some instances, the process continues to generate fingerprints for all other feature points identified/received for the image data, as indicated in step 245.

Figure 3:
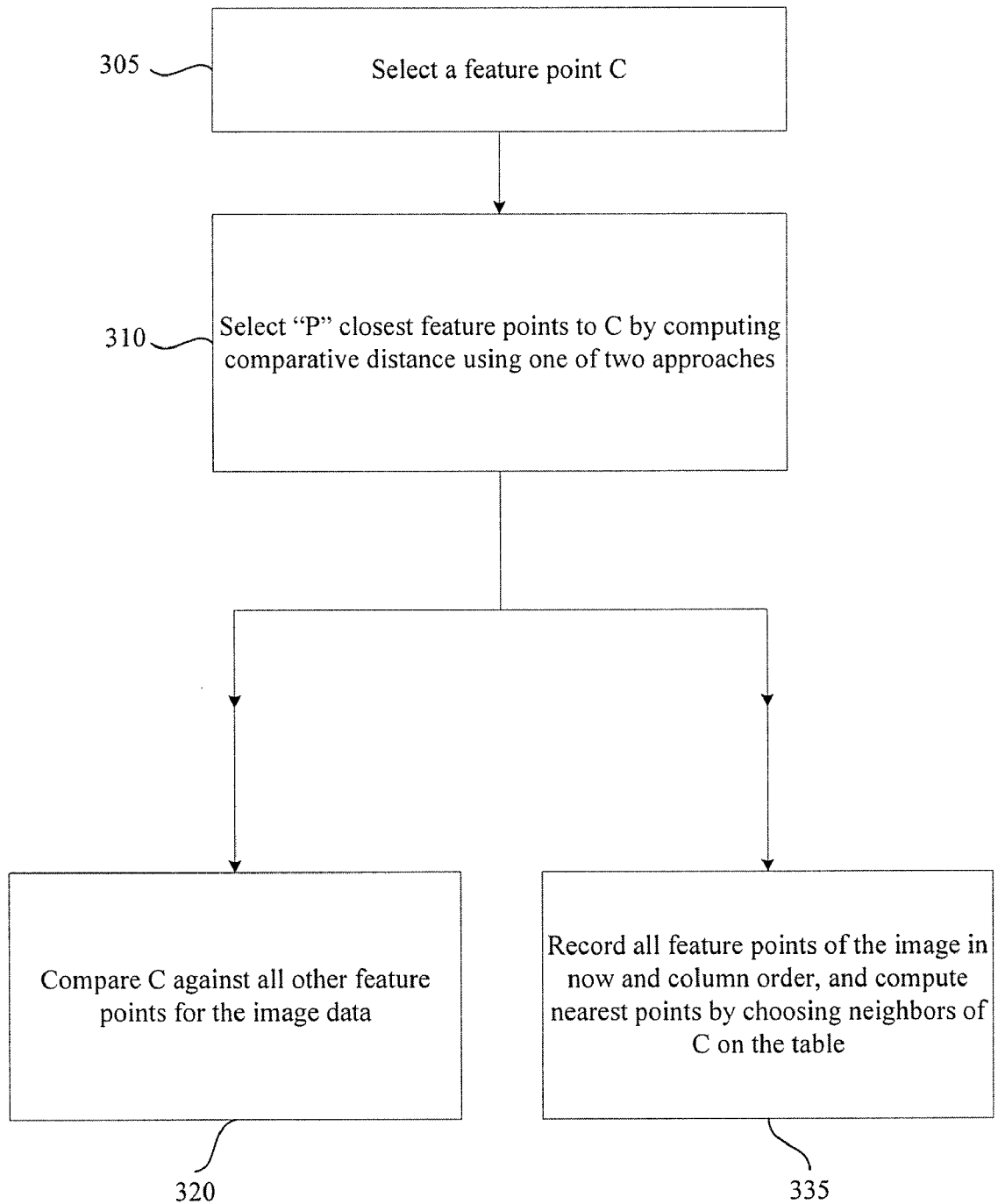
FIG. 3 is a flowchart illustrating a method to generate a P-neighborhood for each feature point.

FIG. 3 is a flow chart illustrating approaches to determine the P-neighborhood feature points for each C-Point. As indicated here, a first C-Point is chosen 305 for determining an associated P-neighborhood. The P-neighborhood, in some instances, involves the determination of P number of closest feature points to the selected C-Point 310. There are at least two approaches through which the P-neighborhood feature points are determined.

In one embodiment, the feature points in the P-neighborhood are determined by computing the distance from the C-Point to every other feature point identified in the image data 320. Based on the resulting distance values, the first P-number of closest feature points are identified to form the P-neighborhood for the C-Point. Because this approach computes the distance from the C-Point to every feature point of the image data, it is computationally expensive, especially because the entire set of computations has to be repeated for every feature point of the image data. For example, if there are n number of feature points in the image data, this approach would require a total of $O(n^2)$ computations.

In another embodiment 335, the feature points of an image data are recorded in row and column order. In some instances, the feature points are recorded, for example, in a table based on their location in the original or normalized image. Here, the search for the nearest feature points for a particular feature point ends after identifying the row and/or column of the maximum point state based on the required number of feature points in the P-neighborhood. This approach is preferable over the approach explained in step 320 due to the considerable reduction in the number of required computations. The effective number of computations in this approach, in some instances, is $2O(n)$. Using this approach also contributes to improving the overall computational efficiency of image fingerprint generation.

Figure 4:
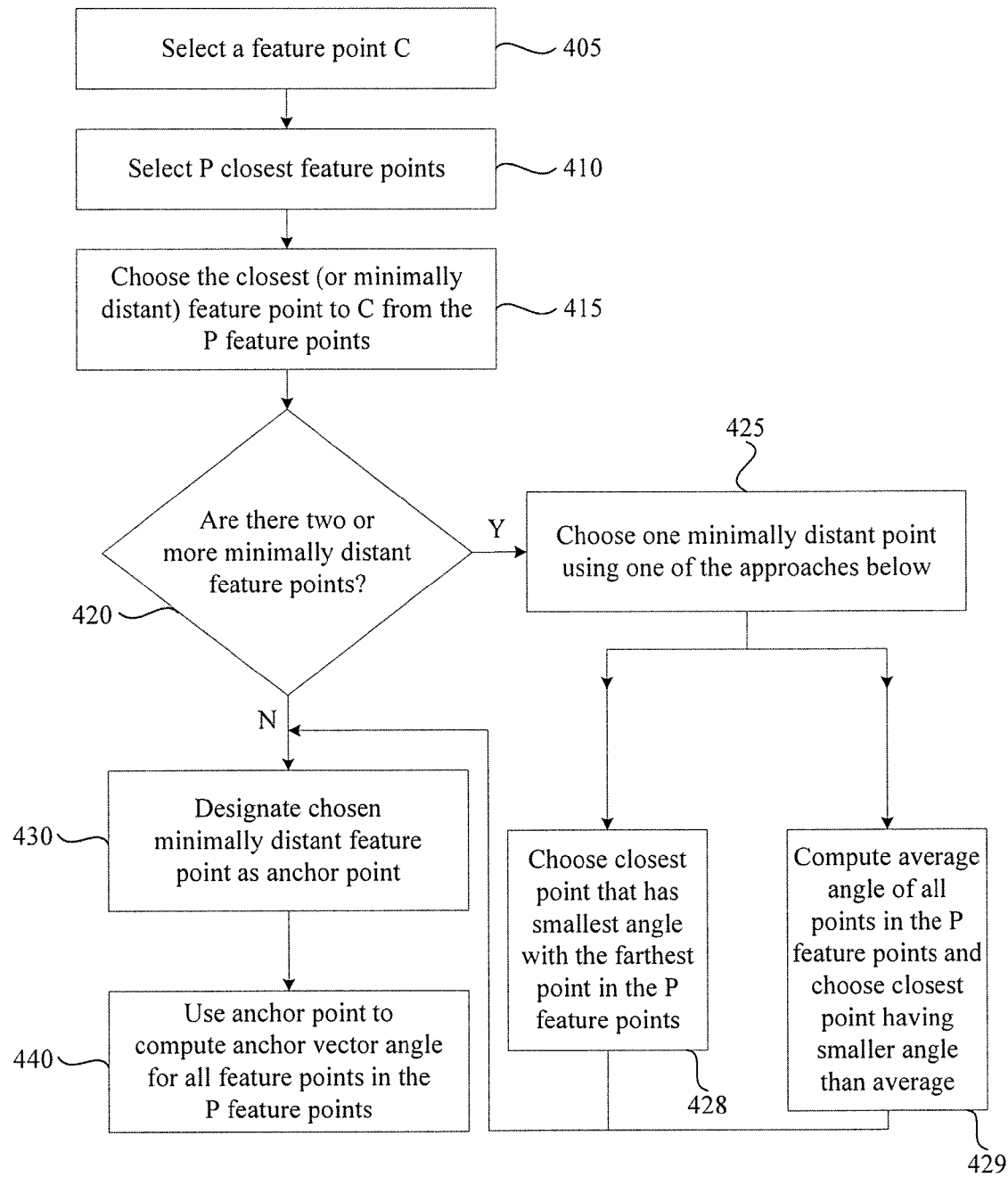
FIG. 4 is a flowchart depicting a method to generate point vectors for a particular feature point.

FIG. 4 is a flow chart depicting techniques for computation of point vectors for each C-Point. A C-Point for which point vectors are to be computed is first selected 405. In step 410, a P-neighborhood, as discussed in detail above, is established for the C-Point by selecting P closest feature points. In some instances, the "closest" of the P closest feature points is identified as an anchor point 415. The anchor point, in other words, is the closest feature point to a C-Point. One of the two comparative distance approaches discussed above (step 320 or step 335 of FIG. 3), for example, may be used in determining the anchor point.

However, in some instances, there may be more than one closest feature points to a C-Point 420. In such instances, one of the closest feature points is chosen as the anchor point by using several approaches 425. In one embodiment, the closest feature point that has the smallest angle with the farthest point in the P-neighborhood is designated as the anchor point 428. In another embodiment, as indicated in step 429, the average angle of all feature points in the P-neighborhood is computed, and the anchor point is chosen based on which closest feature point has a smaller angle to the average angle value. It is understood that other approaches known to people skilled in the art may also be implemented to determine one closest point among several closest points here.

Therefore, using one of several approaches, one least minimally distant feature point is designated as the anchor point 430. The angle between the C-Point and the anchor point is calculated (hereinafter the "anchor vector angle"). In some instances, the anchor vector angle is used to determine the relative angle between the C-Point and the remaining feature points of the P-neighborhood, as indicated in step 440. In one embodiment, the anchor vector angle is assigned, for example, a zero value, and relative angle values are determined for all other feature points in relation to the anchor vector angle.

In some instances, the relative angles are computed in a predetermined direction of rotation. In one embodiment, the direction of rotation is fixed (e.g., the angles are always computed in a clockwise direction relative to the location of the anchor point). In another embodiment, the direction of rotation is determined independently for each P-neighborhood. In some instances, the direction of rotation of a particular P-neighborhood is determined based on features local to that particular P-neighborhood. In one example, the direction is chosen by rotating from the anchor point to another feature point with the smallest angle to the anchor point. In another example, the direction is chosen by rotating from the anchor point to a most-distant feature point in the P-neighborhood.

The use of the localized direction of rotation at the registration and matching stages ensures that the fingerprints are robust against certain changes in derivate image data. For example, flipping or mirror transforms in the derivate image data will cause the relative angles to also flip or mirror correspondingly, resulting in a fingerprint matching the same feature in the original image.

Figure 5:
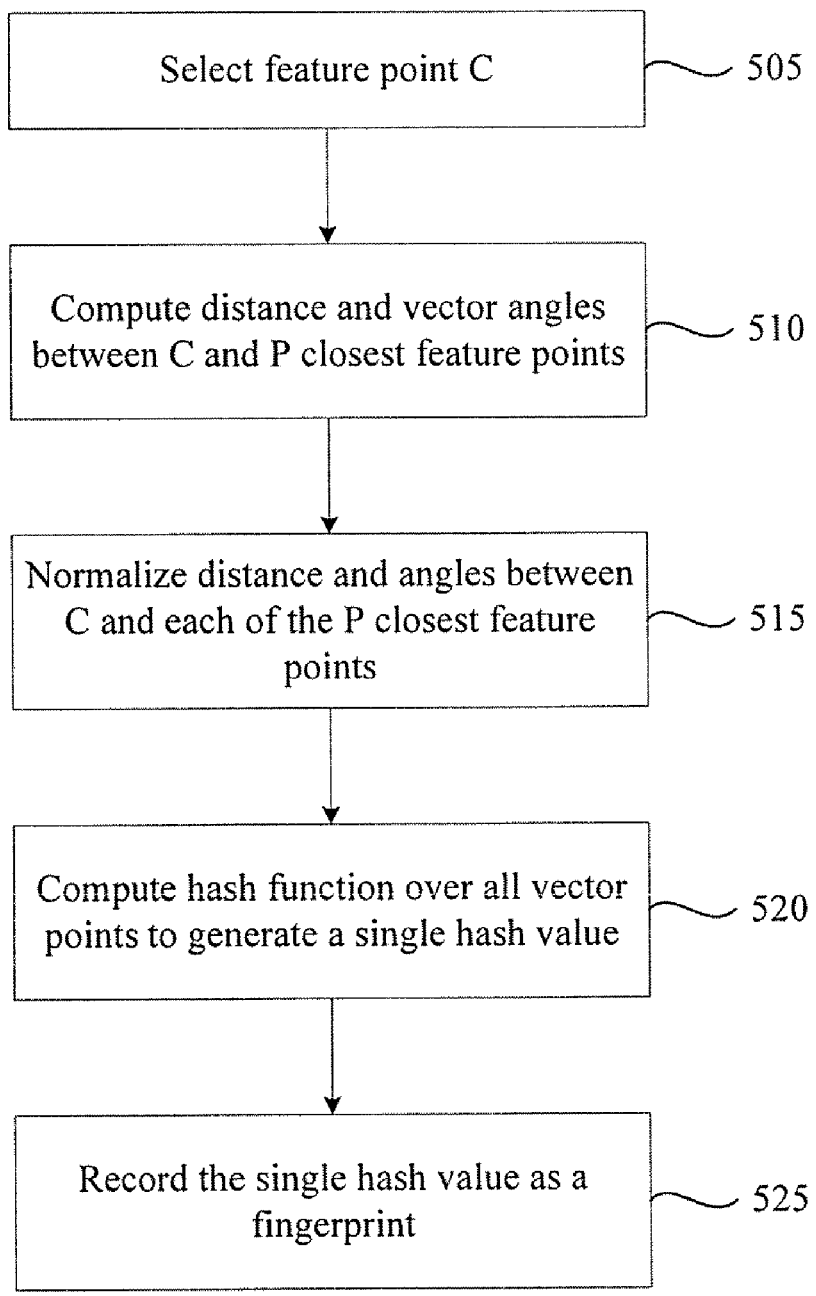
FIG. 5 is a flowchart illustrating a method for generating fingerprints from point vectors.

FIG. 5 is a flow chart that illustrates techniques for generating fingerprints for each feature point using their corresponding point vectors. A feature point (C-Point) for which the fingerprint is to be generated is first chosen 505. The angle and distance between the C-Point and a collection of neighboring feature points is computed to determine point vectors corresponding to the C-Point 510. In some instances, an anchor point is determined, as explained above, to compute the distance and angle of the point vectors relative to this anchor point.

In one embodiment, the distances and angles of each point vector is normalized in relation to the anchor point 515. For example, the value of the distance between the C-Point and each feature point of the P-neighborhood is divided by the distance between the C-Point and the anchor point. The angle values are also, in some instances, normalized in a similar fashion.

A hash function is then run over all the point vectors of the P-neighborhood 520. The hash function, in some instances, is applied in a predetermined direction. For example, one of the directions explained in step 440 of FIG. 4 may be employed to apply the hash function. Any hash function known to people skilled in the art may be applied to compute one final hash value that corresponds to the point vectors of the P-neighborhood of a particular C-Point. In some instances, the point vector corresponding to the anchor point may be excluded from the hash generation, further improving the overall computational efficiency. In one embodiment, the single hash value is an integer calculated based on the point vectors of a particular P-neighborhood. The single hash value is designated as the fingerprint corresponding to the C-Point 525.

In some instances, the angles and distance values are rounded to their nearest floor or ceil values before applying the hash function. This ensures that similar fingerprints are generated for related features of the image data.

In some instances, the normalized point vector data and direction of rotation (as discussed in step 440 of FIG. 4) may also be used as a descriptor of the C-Point instead of generating the fingerprint using the hash generator. In such instances, an ordered list of the point vector data based on the direction of orientation may be considered in a (P−1)*2 dimensional space. In one embodiment, nearest neighbor techniques, for example, may be employed to match client P-neighborhood vector descriptors to registered descriptors. However, this approach increases the overall complexity of the detection and registration processes. Generation of a single fingerprint, as described in FIG. 5, on the other hand, considerably reduces the amount of data stored, and the lookup becomes, for example, a single integer match.

The systems corresponding to the methods explained above and associated embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

I claim:

1. A computer implemented method for fingerprinting image data, the computer implemented method comprising:
    selecting a first feature point in the image data;
    identifying a plurality of neighborhood feature points closest in distance to the first feature point, wherein the plurality of neighborhood feature points closest in distance to the first feature point includes a P-neighborhood, the P-neighborhood including P number of neighborhood feature points closest in distance to the first feature point and feature points in the P-neighborhood are determined by storing all feature points of the image data in a feature point table, and determining P number of feature points closest to the location of the first feature point within the feature point table;
    generating a plurality of point vectors, each point vector computed based on distance and angle between a particular neighborhood feature point and the first feature point; and
    aggregating the plurality of point vectors to generate a fingerprint corresponding to the first feature point.

2. A computer implemented method for fingerprinting image data as recited in claim 1, the computer implemented method further comprising:
    converting the image data to a canonical format.

3. A computer implemented method for fingerprinting image data as recited in claim 2, wherein the canonical format includes mapping the image data to a two dimensional array defining intensity values of the image data at each pixel location.

4. A computer implemented method for fingerprinting image data as recited in claim 1, wherein feature points in the P-neighborhood are determined by comparing the first feature point with all other feature points of the image data.

5. A computer implemented method for fingerprinting image data as recited in claim 1, wherein distance between the first feature point and another feature point of the image data is computed using a Euclidian distance formula.

6. A computer implemented method for fingerprinting image data as recited in claim 5, wherein a final square-root function is not computed in the Euclidian distance formula.

7. A computer implemented method for fingerprinting image data as recited in claim 1, wherein the fingerprint corresponding to the first feature point is generated by applying a hash function over the plurality of point vectors.

8. A computer implemented method for fingerprinting image data as recited in claim 7, wherein the fingerprint corresponding to the first feature point includes an integer value.

9. A computer implemented method for fingerprinting image data, the computer implemented method comprising:
    selecting a first feature point in the image data;
    identifying a plurality of neighborhood feature points closest in distance to the first feature point, wherein the plurality of neighborhood feature points closest in distance to the first feature point includes a P-neighborhood, the P-neighborhood including P number of neighborhood feature points closest in distance to the first feature point;
    generating a plurality of point vectors, each point vector computed based on distance and angle between a particular neighborhood feature point and the first feature point; and
    aggregating the plurality of point vectors to generate a fingerprint corresponding to the first feature point; and
    designating as an anchor point a least distant feature point, the least distant feature point being a specific feature point closest to the first feature point within the P-neighborhood.

10. A computer implemented method for fingerprinting image data as recited in claim 9, wherein the distance and angle between the first feature point and the particular neighborhood feature point is computed relative to the anchor point.

11. A computer implemented method for fingerprinting image data as recited in claim 10, wherein the distance between the particular neighborhood feature point and the first feature point is normalized relative to the distance between the anchor point and the first feature point.

12. A computer implemented method for fingerprinting image data as recited in claim 11, wherein the distance between the first feature point and the anchor point is normalized to a unitary value.

13. A computer implemented method for fingerprinting image data as recited in claim 10, wherein the angle between the particular neighborhood feature point and the first feature point is normalized relative to the angle between the anchor point and the first feature point.

14. A computer implemented method for fingerprinting image data as recited in claim 13, wherein the angle is computed based on a predetermined direction of rotation.

15. A computer implemented method for fingerprinting image data as recited in claim 14, wherein the direction of rotation is determined for a specific P neighborhood based on a feature local to the specific P neighborhood.

16. A computer implemented method for fingerprinting image data as recited in claim 13, wherein the angle between the first feature point and the anchor point is normalized to a zero value.

17. A computer implemented method for fingerprinting image data as recited in claim 10, wherein the values of the normalized distance and angle between the particular neighborhood feature point and the first feature point are rounded to enable generation of substantially similar fingerprints across related features of the image data.

18. A computer implemented method for fingerprinting image data, the computer implemented method comprising:
   selecting a first feature point in the image data;
   selecting a plurality of neighborhood feature points closest in distance to the first feature point, wherein a least distant feature point, measured relative to the first feature point, of the plurality of neighborhood feature points is designated as an anchor point;
   generating a plurality of point vectors, each point vector computed based on distance and angle between a particular neighborhood feature point and the first feature point, wherein the distance and angle are computed relative to the anchor point; and
   aggregating the plurality of point vectors to generate a fingerprint corresponding to the first feature point.

19. A computer implemented method for fingerprinting image data as recited in claim 18, the computer implemented method further comprising:
   converting the image data to a canonical format.

20. A computer implemented method for fingerprinting image data as recited in claim 19, wherein the canonical format includes mapping the image data to a two dimensional array defining intensity values of the image data at each pixel location.

21. A computer implemented method for fingerprinting image data as recited in claim 18, wherein the plurality of neighborhood feature points closest in distance to the first feature point includes a P-neighborhood, the P-neighborhood including P number of neighborhood feature points closest in distance to the first feature point.

22. A computer implemented method for fingerprinting image data as recited in claim 21, wherein feature points in the P-neighborhood are determined by comparing the first feature point with all other feature points of the image data.

23. A computer implemented method for fingerprinting image data as recited in claim 21, wherein feature points in the P-neighborhood are determined by storing all feature points of the image data in a feature point table, and determining P number of feature points closest to the location of the first feature point within the feature point table.

24. A computer implemented method for fingerprinting image data as recited in claim 18, wherein the distance between the particular neighborhood feature point and the first feature point is normalized relative to the distance between the anchor point and the first feature point.

25. A computer implemented method for fingerprinting image data as recited in claim 24, wherein the distance between the first feature point and the anchor point is normalized to a unitary value.

26. A computer implemented method for fingerprinting image data as recited in claim 18, wherein the angle between the particular neighborhood feature point and the first feature point is normalized relative to the angle between the anchor point and the first feature point.

27. A computer implemented method for fingerprinting image data as recited in claim 26, wherein the angle between the first feature point and the anchor point is normalized to a zero value.

28. A computer implemented system for fingerprinting image data, the computer implemented system comprising:
   a processor to execute the operations of an image fingerprinting module, the image fingerprinting module including:
   a selecting means for selecting a first feature point in the image data and for identifying a plurality of neighborhood feature points closest in distance to the first feature point;
   a vector computing means for generating a plurality of point vectors, each point vector computed based on distance and angle between a particular neighborhood feature point and the first feature point; and
   a hash generating means for aggregating the plurality of point vectors and generating a fingerprint corresponding to the first feature point; and
   a memory coupled with the processor, the memory storing instructions corresponding to the operations of the image fingerprinting module;
   wherein the plurality of neighborhood feature points closest in distance to the first feature point includes a P-neighborhood, the P-neighborhood including P number of neighborhood feature points closest in distance to the first feature point; and
   wherein the selecting means determines feature points in the P-neighborhood by storing all feature points of the image data in a feature point table, and then determining P number of feature points closest to the location of the first feature point within the feature point table.

29. A computer implemented system for fingerprinting image data as recited in claim 28, wherein the fingerprinting module further includes:
   an image converting means for converting the image data to a canonical format.

30. A computer implemented system for fingerprinting image data as recited in claim 29, wherein the canonical format includes mapping the image data to a two dimensional array defining intensity values of the image data at each pixel location.

31. A computer implemented system for fingerprinting image data as recited in claim 28, wherein the selecting means determines feature points in the P-neighborhood by comparing the first feature point with all other feature points of the image data.

32. A computer implemented system for fingerprinting image data as recited in claim 28, wherein the selecting means computes distance between the first feature point and an other feature point of the image data using a Euclidian distance formula.

33. A computer implemented system for fingerprinting image data as recited in claim 32, wherein a final square-root function is not computed in the Euclidian distance formula.

34. A computer implemented system for fingerprinting image data as recited in claim 28, wherein the hash generating means generates the fingerprint corresponding to the first feature point by applying a hash function over the plurality of point vectors.

35. A computer implemented system for fingerprinting image data as recited in claim 34, wherein the fingerprint corresponding to the first feature point includes an integer value.

36. A computer implemented system for fingerprinting image data, the computer implemented system comprising:
  a processor to execute the operations of an image fingerprinting module, the image fingerprinting module including:
  a selecting means for selecting a first feature point in the image data and for identifying a plurality of neighborhood feature points closest in distance to the first feature point;
  a vector computing means for generating a plurality of point vectors, each point vector computed based on distance and angle between a particular neighborhood feature point and the first feature point; and
  a hash generating means for aggregating the plurality of point vectors and generating a fingerprint corresponding to the first feature point;
  a memory coupled with the processor, the memory storing instructions corresponding to the operations of the image fingerprinting module; and
  wherein the plurality of neighborhood feature points closest in distance to the first feature point includes a P-neighborhood, the P-neighborhood including P number of neighborhood feature points closest in distance to the first feature point, and wherein the vector computing means designates, relative to the first feature point, a least distant feature point within the P-neighborhood as an anchor point.

37. A computer implemented system for fingerprinting image data as recited in claim 36, wherein the vector computing means computes the distance and angle between the first feature point and the particular neighborhood feature point and the first feature point relative to the anchor point.

38. A computer implemented system for fingerprinting image data as recited in claim 37, wherein the vector computing means normalizes the distance between the particular neighborhood feature point and the first feature point relative to the distance between the anchor point and the first feature point.

39. A computer implemented system for fingerprinting image data as recited in claim 38, wherein the vector computing means normalizes the distance between the first feature point and the anchor point to a unitary value.

40. A computer implemented system for fingerprinting image data as recited in claim 37, wherein the vector computing means normalizes the angle between the particular neighborhood feature point and the first feature point relative to the angle between the anchor point and the first feature point.

41. A computer implemented method for fingerprinting image data as recited in claim 40, wherein the angle is computed based on a predetermined direction of rotation.

42. A computer implemented method for fingerprinting image data as recited in claim 41, wherein the direction of rotation is determined for a specific P neighborhood is based on a feature local to the specific P neighborhood.

43. A computer implemented system for fingerprinting image data as recited in claim 40, wherein the vector computing means normalizes the angle between the first feature point and the anchor point to a zero value.

44. A computer implemented system for fingerprinting image data as recited in claim 37, wherein the vector computing means rounds values of the normalized distance and angle between the particular neighborhood feature point and the first feature point to enable generation of substantially similar fingerprints across related features of the image data.

45. A computer implemented method for fingerprinting image data, the computer implemented method comprising:
  selecting a first feature point in the image data;
  identifying a plurality of neighborhood feature points closest in distance to the first feature point, wherein the plurality of neighborhood feature points closest in distance to the first feature point includes a P-neighborhood, the P-neighborhood including P number of neighborhood feature points closest in distance to the first feature point;
  generating a plurality of point vectors, each point vector computed based on distance and angle between a particular neighborhood feature point and the first feature point;
  aggregating the plurality of point vectors to generate a fingerprint corresponding to the first feature point;
  wherein distance between the first feature point and an other feature point of the image data is computed using a Euclidian distance formula and a final square-root function is not computed in the Euclidian distance formula.

* * * * *